United States Patent [19]
Parsoneault et al.

[11] Patent Number: 5,969,903
[45] Date of Patent: Oct. 19, 1999

[54] MAGNETIC PARTICLE TRAP FOR HYDRODYNAMIC BEARING

[75] Inventors: Norbert S. Parsoneault, Scotts Valley; Michael D. Kennedy, Boulder Creek; Hans Leuthold, Santa Cruz, all of Calif.

[73] Assignee: Seagate Technology, Inc., Scotts Valley, Calif.

[21] Appl. No.: 09/135,098

[22] Filed: Aug. 17, 1998

Related U.S. Application Data

[63] Continuation-in-part of application No. 08/387,463, Feb. 13, 1995, abandoned.

[51] Int. Cl.[6] .......................... G11B 17/02; F16C 32/06; B01D 35/06
[52] U.S. Cl. ...................... 360/99.08; 384/113; 210/222
[58] Field of Search ........................... 360/98.07, 99.08; 384/100, 107, 111, 113, 114, 115, 118, 120; 210/222

[56] References Cited

U.S. PATENT DOCUMENTS

| | | | |
|---|---|---|---|
| 3,283,905 | 11/1966 | Cass | 210/222 |
| 3,800,914 | 4/1974 | Miyata | 184/6.25 |
| 4,440,402 | 4/1984 | Pinkus et al. | 277/80 |
| 4,630,943 | 12/1986 | Stahl et al. | 384/133 |
| 4,673,997 | 6/1987 | Gowda et al. | 360/107 |
| 4,759,842 | 7/1988 | Frees et al. | 210/94 |
| 4,779,165 | 10/1988 | Elsaesser et al. | 360/97 |
| 4,784,767 | 11/1988 | Hasuda et al. | 210/222 |
| 4,851,116 | 7/1989 | Tomita | 210/222 |
| 4,934,836 | 6/1990 | Tanaka et al. | 384/100 |

(List continued on next page.)

FOREIGN PATENT DOCUMENTS 4-78315  3/1992  Japan .

OTHER PUBLICATIONS

S. Prina and C. Taft, "The Design and Analysis of Brushless DC Motors Having Smooth Rotor Back Iron", pp. 75–100 (undated).

*DC Motors Speed Controls Servo Systems*, "Brushless DC Motors", Electro–Craft Corporation, Hopkins, MN, Chapter 6, pp. 6–6—6–17 (1972).

C. Veinott, *Theory and Design of Small Induction Motors*, "Air–Gap MMF and Flux Waves Set Up By A Single–Phase Winding", published by McGraw–Hill Book Company, Inc., New York, Chapter 14, pp. 265–281 (1959).

C. Veinott, *Theory and Design of Small Induction Motors*, "Air–Gap MMF Waves Set Up By Polyphase Stator Winding", published by McGraw–Hill Book Company, Inc., New York, Chapter 15, pp. 282–290 (1959).

A.E. Fitzgerald, C. Kingsley, Jr. and S. Umans, *Fourth Edition—Electric Machinery*, "AC Machines", published by McGraw–Hill Company, Inc., New York, pp. 133–135 (1983).

T.H. Barton, J.C. Dunfield, *IEEE Transactions on Power Apparatus and Systems*, "Inductances of a Practical Slip–Ring Primitive", IEEE, vol. PAS–85/No. 2, pp. 140–159 (1966).

J.C. Dunfield, T.H. Barton, *Proceedings of The Institution of Electrical Engineers*, "Effect of m.m.f. and permeance harmonics in electrical machines—with special reference to a synchronous machine", The Inst. of Elect. Eng., Savoy Place, London WC2, vol. 114, No. 10, pp. 1443–1450 (1967).

*Primary Examiner*—Jefferson Evans
*Attorney, Agent, or Firm*—Westman, Champlin & Kelly, P.A.

[57] ABSTRACT

A disc drive system includes a hydrodynamic bearing. The disc drive system includes a disc drive chassis, a storage disc, and a read/write transducer adjacent to the disc for reading and writing information on the disc. The hydrodynamic bearing assembly rotatably couples the storage disc to the disc drive chassis. The hydrodynamic bearing assembly includes a fluid path therethrough for circulating a fluid. A permanent magnet is placed in the fluid path and used for attracting magnetic particles carried in the fluid.

13 Claims, 3 Drawing Sheets

U.S. PATENT DOCUMENTS

| | | | |
|---|---|---|---|
| 4,938,611 | 7/1990 | Nii et al. | 384/133 |
| 4,965,476 | 10/1990 | Lin | 310/51 |
| 5,011,165 | 4/1991 | Cap | 277/80 |
| 5,013,947 | 5/1991 | Ide | 310/67 |
| 5,140,479 | 8/1992 | Elsing et al. | 360/97.01 |
| 5,141,338 | 8/1992 | Asada et al. | 384/114 |
| 5,142,173 | 8/1992 | Konno et al. | 310/67 |
| 5,142,174 | 8/1992 | Ide | 310/67 |
| 5,215,385 | 6/1993 | Ide | 384/100 |
| 5,223,758 | 6/1993 | Kataoka et al. | 310/90 |
| 5,224,782 | 7/1993 | Miwa et al. | 384/100 |
| 5,246,294 | 9/1993 | Pan | 384/119 |
| 5,267,737 | 12/1993 | Cossette et al. | 277/80 |
| 5,284,391 | 2/1994 | Diel et al. | 384/108 |
| 5,328,271 | 7/1994 | Titcomb | 384/108 |
| 5,358,339 | 10/1994 | Konno et al. | 384/107 |
| 5,366,298 | 11/1994 | Toshimitsu et al. | 384/107 |
| 5,367,416 | 11/1994 | Cossette et al. | 360/97.02 |
| 5,376,850 | 12/1994 | Elsing et al. | 310/67 |
| 5,376,851 | 12/1994 | Lipo et al. | 310/179 |
| 5,376,852 | 12/1994 | Kawamura et al. | 310/198 |
| 5,389,252 | 2/1995 | Morrick | 210/223 |
| 5,423,612 | 6/1995 | Zang et al. | 384/119 |
| 5,427,456 | 6/1995 | Hensel | 384/112 |
| 5,441,647 | 8/1995 | Wascher et al. | 210/695 |
| 5,458,785 | 10/1995 | Howe et al. | 210/695 |
| 5,465,078 | 11/1995 | Jones, Jr. | 335/305 |
| 5,504,637 | 4/1996 | Asada et al. | 360/98.07 |
| 5,524,986 | 6/1996 | Leuthold et al. | 384/119 |
| 5,729,404 | 3/1998 | Dunfield et al. | 360/99.08 |

MAGNETIC PARTICLE TRAP FOR HYDRODYNAMIC BEARING

This is a Continuation-In-Part of U.S. Pat. application Ser. No. 08/387,463, filed Feb. 13, 1995 abandoned has been revived and entitled "MAGNETIC DISC DRIVE HAVING MAGNETIC PARTICLE TRAP FOR HYDRODYNAMIC BEARING".

BACKGROUND OF THE INVENTION

The present invention relates to disc drive systems for storing information. More specifically, the present invention relates to a hydrodynamic bearing assembly which provides support and rotation for a high speed spindle element.

The predominant trend in the disc drive storage industry for the past several years has been to increase track density in order to achieve increased data storage capacity. One of the difficulties which must be overcome in achieving this goal is the ability to maintain tracking position accuracy as the track density increases.

A major source of tracking position inaccuracy in a computer disc drive system is spindle bearing motion which is commonly referred to as "runout". Conventional spindle bearings include ball bearing assemblies which are prone to numerous mechanical problems, such as large runout, substantial wear, capacious manufacturing requirements, and the like.

A hydrodynamic bearing is an alternative to conventional ball bearing spindle systems. In a hydrodynamic bearing assembly, a lubricating fluid functions as the actual bearing surface between a stationary base and the rotating spindle or hub/sleeve. The lubricating fluid typically includes either air or liquid. The rotating hub/sleeve causes the fluid to circulate through the hydrodynamic bearing. When the hub/sleeve is stationary, the fluid is at rest.

Hydrodynamic bearing assemblies suffer from a number of disadvantages. For example, the parts within a hydrodynamic bearing contact each other generally along a line, whereas the parts within a ball bearing assembly contact each other along a point. During use, the stationary parts may contact the rotating hub/sleeve causing wear. The wear causes undesirable metal particles to be broken away from the bearing assembly. The inner chamber carrying the fluid is sealed to prevent leakage, however, and the particles are carried in the fluid which contaminates the bearing assembly.

The particles carried in the fluid contact the bearing assembly and create additional wear and particles. Furthermore, the particles carried in the fluid can cause inefficient fluid flow. Inefficient fluid flow creates an inefficient bearing which has a shorter life. An inefficient bearing is also prone to runout which degrades motor performance.

SUMMARY OF THE INVENTION

The present invention includes a hydrodynamic bearing assembly for use in, for example, a disc drive system which traps particles carried therein. The disc drive system includes a disc drive chassis, a storage disc, a read/write transducer adjacent to the disc for reading and writing information on the disc, and a hydrodynamic bearing assembly. The hydrodynamic bearing assembly rotatably couples the storage disc to the disc drive chassis. The hydrodynamic bearing assembly includes a fluid path therethrough for circulating a fluid. A magnetic rod in the fluid path attracts magnetic particles carried in the fluid.

DETAILED DESCRIPTION OF THE PREFERRED EMBODIMENTS

Figure 1:
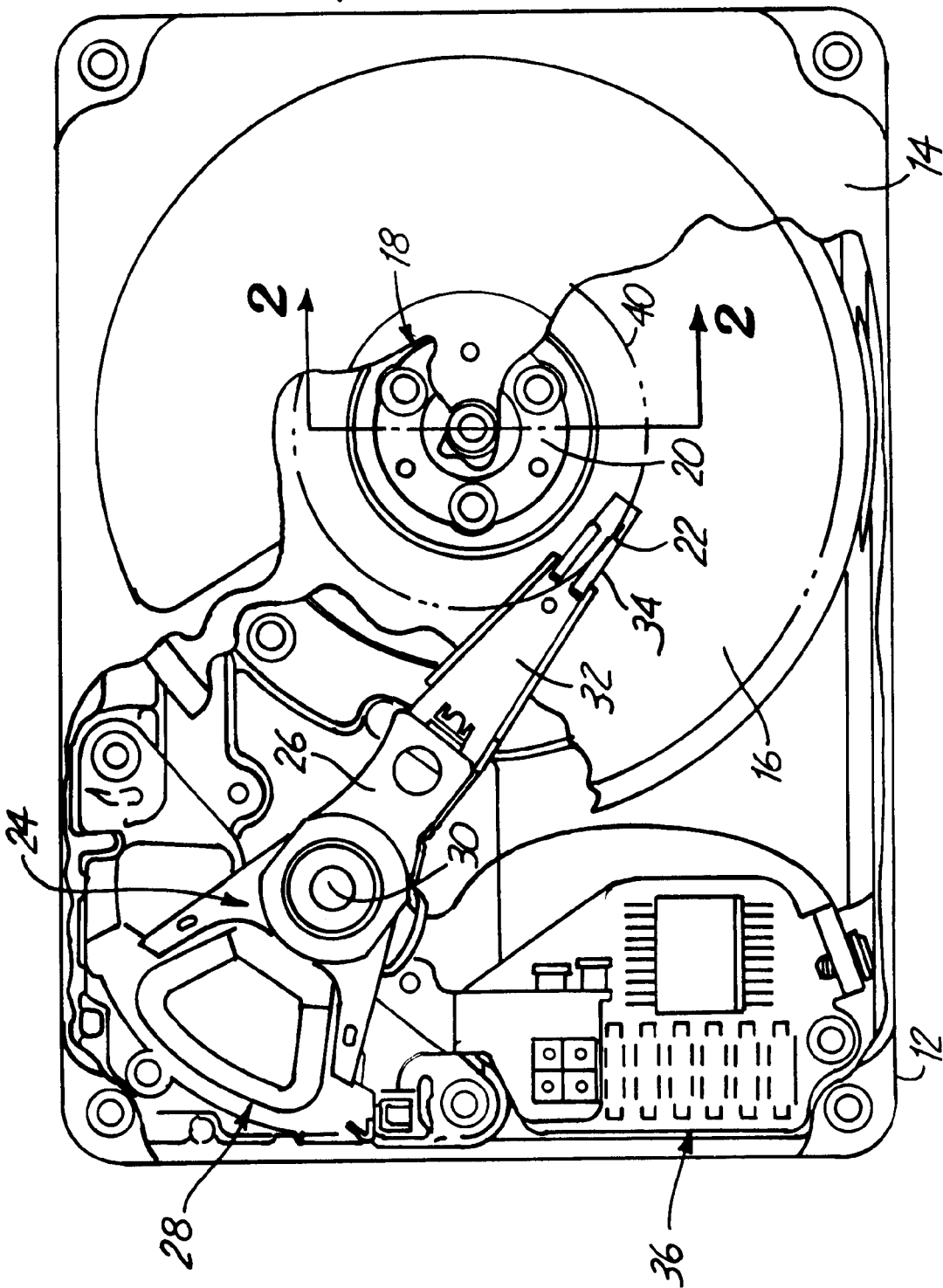
FIG. 1 is a top plan view of a magnetic disc drive including features in accordance with the present invention.

FIG. 1 shows a plan view of a disc drive 10 for use with the present invention. Disc drive 10 includes a chassis member 12 to which internal components of the disc drive 10 are mounted. Chassis member 12 couples to top cover 14 which forms a sealed environment for critical parts of the disc drive 10.

Disc drive 10 includes at least one, but typically a plurality of discs 16 which are mounted for rotation on a spindle 18 having a bearing assembly 20. The bearing assembly 20 is described in greater detail below. Typically, a plurality of magnetic read/write heads 22 are mounted to an actuator 24 having an actuator body 26 and an actuator motor 28. In the example shown at disc drive 10, actuator 24 is a rotary actuator which is mounted for pivoting about a pivot axis 30. Actuator 24 includes a number of head mounting arms 32 which couple the heads 22 to the actuator body 26 using a plurality of gimbal assemblies 34. Actuator motor 28 is also coupled to actuator body 26 to provide a force to move the heads 22 to a desired position on the surface of the disc 16.

In operation, the spindle 18 causes disc 16 to rotate. Electronic circuitry 36 energizes the actuator motor 28 causing the actuator 24 to rotate about pivot axis 30 whereby the magnetic read/write head 22 is moved through an arc radially across the surface of the disc 16. Actuator 24 positions head 22 over a concentric track, for example, track 40. This allows the electronic circuitry 36 to read back or write information at desired locations on disc 16.

Figure 2:
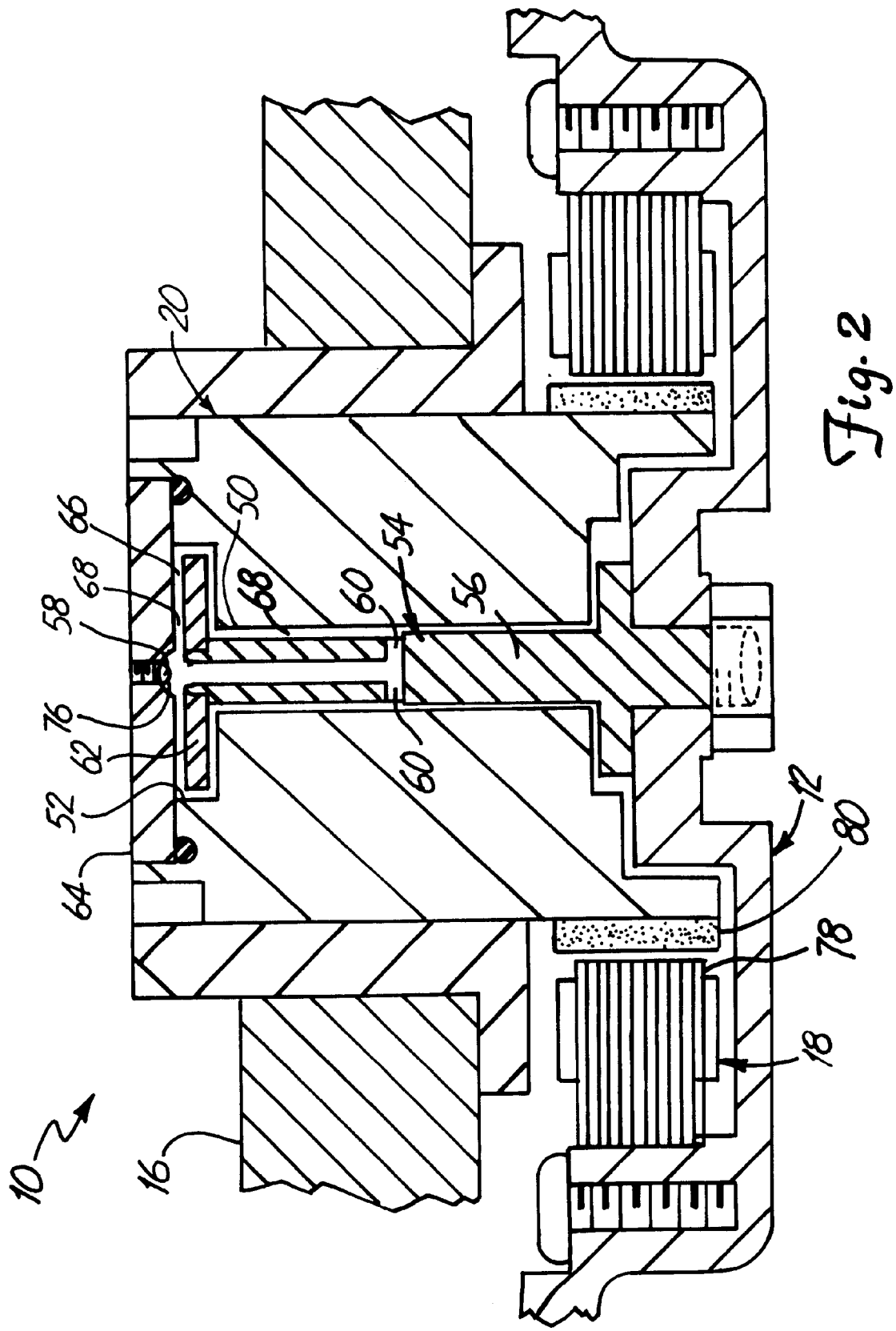
FIG. 2 is a cross-sectional view of the hub/sleeve shown in FIG. 1 taken along the line labeled 2—2.

As shown in FIG. 2, the hub/sleeve 20 includes a bore 50 therethrough and is typically open at one end 52. The hub/sleeve 20 is rotatably coupled to a bearing assembly 54. The spindle motor 18 includes a stator assembly 78 preferably coupled to the chassis member 12 and a magnetized magnet 80 coupled to the hub/sleeve 20. Interaction between the stator assembly 78 and the magnet 80 causes the hub/sleeve 20 to rotate about the bearing assembly 54.

The bearing assembly 54 includes a shaft 56 connected to the chassis member 12. The shaft 56 includes a bore 58 and side opening 60. A thrust plate 62 is connected to one end of the shaft 56 to secure the hub/sleeve 20 to the bearing assembly 54. A counterplate 64 is connected to the hub/sleeve 20 and covers the opening 52. Preferably, the inside diameter of the bore 50 is greater than the outside diameter of the shaft 56 so as to create a chamber 66 between the shaft 56 and the hub/sleeve 20. The chamber 66 is filled with a lubricating fluid 68. The fluid 68 is sealed within the chamber 66 using a barrier film (not shown).

Figure 3:
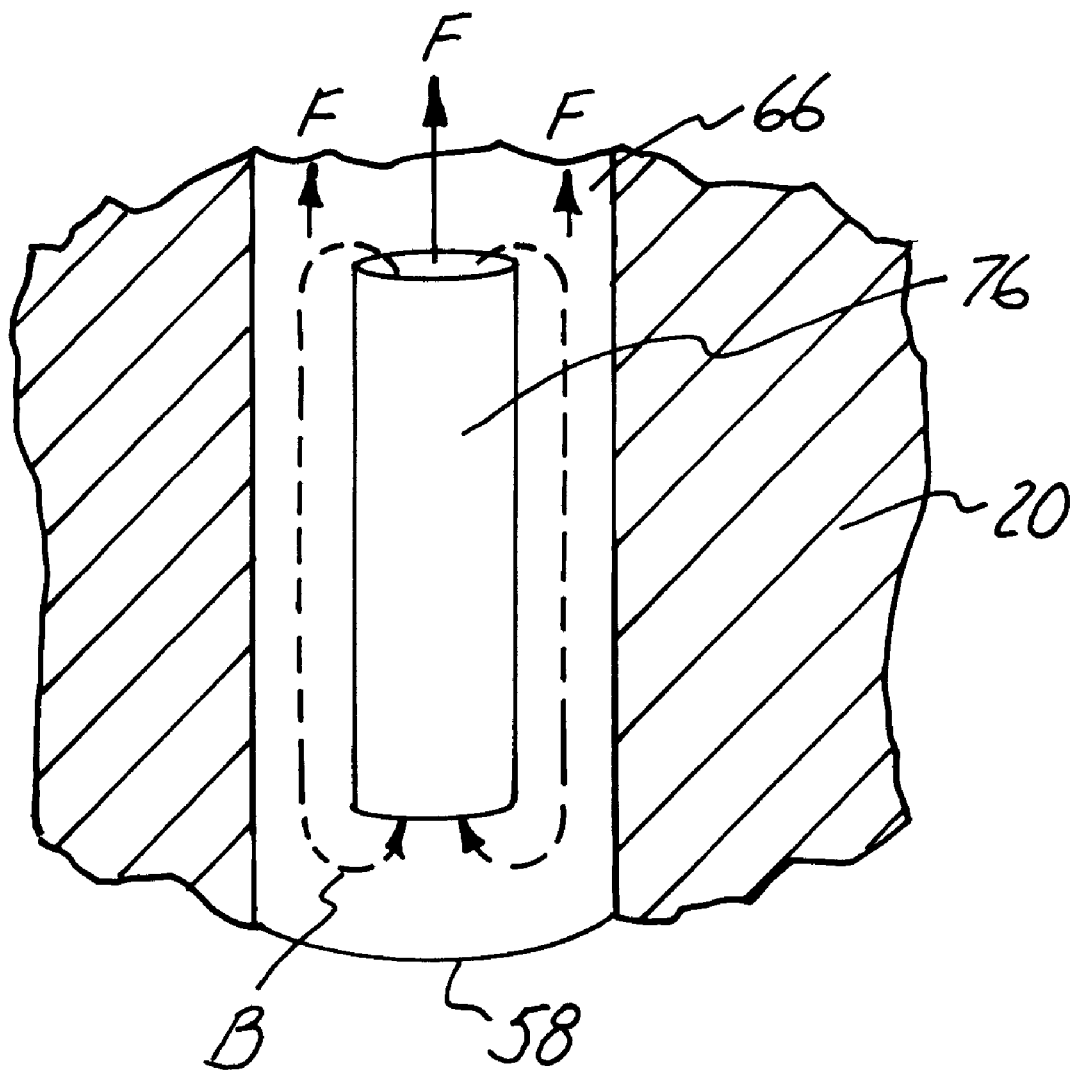
FIG. 3 is a more detailed partial cross-sectional view of the hub/sleeve of FIG. 2.

In accordance with the invention, a magnetized rod 76 in bore 58 traps magnetic particles in fluid 68. When the hub/sleeve 20 is not rotating, the fluid 68 within the chamber 66 is at rest. The counterplate 64 is in contact with the thrust plate 62 if the disc drive 10 is in the horizontal position; or the shaft 56 is in contact with the hub/sleeve 20 if the disc drive 10 is in the vertical position. When the hub/sleeve 20 is rotating, pressure differentials within chamber 66 cause the fluid 68 to circulate through the chamber 66. As shown in FIG. 3, the fluid 68 circulates through the bore 58 and side opening 60 and around the shaft and thrust plate 62. When the hub/sleeve is rotating the fluid 68 suspends the counterplate 64 away from the thrust plate 62 such that the hub/sleeve can freely rotate about the shaft 56 and thrustplate 62.

In one embodiment, the components of the bearing assembly 54 are fabricated from series 430 stainless steel. Surface to surface contact from start-up and runout cause mechanical wear within the bearing assembly 54. Mechanical wear introduces steel particles into the chamber 66. The particles are carried with the fluid 68. As the fluid 68 circulates within the chamber 66, the particles pass proximate the magnet 76. The particles are attracted to the magnet 76 and are thus trapped in the magnetic field and collected on magnet 76. Fluids circulating up through the shaft 56 must flow past the magnet 76. Thus, the particles will be attracted to the magnet and trapped by the magnetic field.

FIG. 3 is a partial cross-sectional view showing magnetized rod 76, magnetic flux lines B and fluid flow F. Rod 76 is suspended in the hydrostatic fluid with approximately 100 microns of clearance on all sides. Elongated rod 76 is particularly advantageous because it presents a relatively large surface area which is directly in the flow F of hydrostatic fluid. In one preferred embodiment, rod 76 comprises an alloy of AlNiCo such as Formag which is available from International Magnaproducts, Inc. of West Minster, Colo. which can be formed using wire drawing techniques. Rod 76 may also be formed from hard magnetic steel such as 36% Cobalt stainless steel or from nickel plated carbon steel. Further, rod 76 fills bore 58 thereby reducing the volume of oil in the hydrostatic bearing. Reduced oil volume is desirable because the oil has a relatively high coefficient of expansion.

Alternative embodiments of the present invention are contemplated, such as different types and shapes of the magnet or magnets or its position. The present invention can be utilized in embodiments having a fluid filled chamber, a rotating member, and a stationary member.

Although the present invention has been described with reference to preferred embodiments, workers skilled in the art will recognize that changes may be made in form and detail without departing from the spirit and scope of the invention. The invention is useful with any storage system including magnetic and optical systems.

What is claimed is:

1. A hydrodynamic motor assembly, comprising:
   a hydrodynamic bearing assembly rotatably coupling to a spindle, the hydrodynamic bearing including an elongate axially aligned cavity formed therein and generally coaxial with an axis of the bearing assembly and having a fluid path therethrough for circulating a fluid; and
   an elongated magnetized rod disposed in the cavity in the fluid path for attracting magnetic particles carried in the fluid and wherein the magnetized rod extends in an axial direction.

2. The hydrodynamic motor assembly of claim 1 wherein the cavity comprises a bore of the bearing assembly.

3. The hydrodynamic motor assembly of claim 1 wherein the rod floats in the fluid.

4. The hydrodynamic motor assembly of claim 1 wherein the magnetized rod comprises AlNiCo.

5. The hydrodynamic motor assembly of claim 1 wherein the magnetic rod comprises magnetic stainless steel.

6. The hydrodynamic motor assembly of claim 1 wherein the magnetized rod comprises nickel plated steel.

7. A disc drive storage system, comprising:
   a disc drive chassis;
   a magnetic storage disc;
   a read/write transducer adjacent the disc for reading and writing information on the disc; and
   a hydrodynamic motor according to claim 1 coupled to rotate the disc.

8. A bearing device in a hydrodynamic motor, comprising:
   a hub/sleeve having a fluid path for circulating a fluid;
   a shaft disposed within the fluid path, the shaft having a bore formed therein forming a portion of the fluid path, the bore extending in an axial direction generally aligned and coaxial with an axis of the hub/sleeve; and
   a magnetic rod disposed within bore and the fluid path for attracting magnetic particles carried in the fluid, the magnetized rod extends in an axial direction.

9. The bearing device of claim 8 wherein the magnetic rod floats in the fluid.

10. The bearing device of claim 8 wherein the magnetized rod comprises AlNiCo.

11. The bearing device of claim 8 the magnetic rod comprises magnetic stainless steel.

12. The bearing device of claim 8 wherein the magnetized rod comprises nickel plated steel.

13. A device in spindle motor of a disc storage system, comprising:
   fluid means for providing a lubricated bearing in the motor; and
   means for removing magnetic particles from the fluid means.

* * * * *